(12) United States Patent
Sharp (10) Patent No.: US 9,879,992 B2
(45) Date of Patent: Jan. 30, 2018

(54) VIRTUAL PERSPECTIVE CENTER ALIGNED WITH MEASUREMENT CENTER

(75) Inventor: Kevin Sharp, Heathcote (NZ)

(73) Assignee: Trimble Inc., Sunnyvale, CA (US)

( * ) Notice: Subject to any disclaimer, the term of this patent is extended or adjusted under 35 U.S.C. 154(b) by 1432 days.

(21) Appl. No.: 12/717,003

(22) Filed: Mar. 3, 2010

(65) Prior Publication Data

US 2011/0157359 A1  Jun. 30, 2011

Related U.S. Application Data (60) Provisional application No. 61/290,818, filed on Dec. 29, 2009.

(51) Int. Cl.
  *H04N 7/18* (2006.01)
  *G01C 11/02* (2006.01)
  *G01S 19/36* (2010.01)

(52) U.S. Cl.
  CPC .............. *G01C 11/02* (2013.01); *G01S 19/36* (2013.01)

(58) Field of Classification Search
  CPC ................................ G01C 11/00; G01C 11/02
  USPC .................................................. 348/143–147
  See application file for complete search history.

(56) References Cited

U.S. PATENT DOCUMENTS

| | | | |
|---|---|---|---|
| 5,165,109 A | 11/1992 | Han et al. | |
| 5,515,057 A | 5/1996 | Lennen et al. | |
| 6,281,970 B1* | 8/2001 | Williams | G01C 21/00 250/334 |
| 6,834,234 B2 | 12/2004 | Scherzinger et al. | |
| 6,928,384 B2* | 8/2005 | Kochi | G06T 7/0075 348/E13.008 |
| 7,541,974 B2 | 6/2009 | Scherzinger | |
| 7,616,885 B2* | 11/2009 | Chen | G03B 35/02 348/42 |
| 7,746,380 B2* | 6/2010 | Maruya | G08B 13/19645 348/169 |
| 7,804,996 B2* | 9/2010 | Ohtomo | G01C 11/06 345/419 |
| 8,027,577 B2* | 9/2011 | Kurosawa | G03B 17/00 396/49 |
| 8,063,971 B2* | 11/2011 | Suda | G03B 13/06 348/333.02 |
| 8,144,232 B2* | 3/2012 | Larson | H04N 5/23293 348/239 |
| 8,154,615 B2* | 4/2012 | Fedorovskaya | G06Q 30/02 348/222.1 |

(Continued)

FOREIGN PATENT DOCUMENTS

WO WO 2005/059473 A2 6/2005

OTHER PUBLICATIONS

Littlefield, "Theory of the "No-Parallax" Point in Panorama Photography," Feb. 6, 2006; p. 1-19, Version 1.0, Copyright 2006, Rik Littlefield.

*Primary Examiner* — Tung Vo
(74) *Attorney, Agent, or Firm* — Kilpatrick Townsend & Stockton LLP (57) ABSTRACT

An apparatus for acquiring image and location information includes an antenna comprising an element configured to receive signals for determining the location information, and an imaging device coupled to the antenna and configured to acquire the image information. A virtual perspective center of the imaging device is coincident with the element of the antenna.

12 Claims, 4 Drawing Sheets

(56) References Cited

U.S. PATENT DOCUMENTS

| | | | |
|---|---|---|---|
| 8,280,677 B2* | 10/2012 | Otani | G01C 1/04 |
| | | | 356/142 |
| 8,471,906 B2* | 6/2013 | Belenkii | G01C 21/02 |
| | | | 348/144 |
| 8,885,882 B1* | 11/2014 | Yin | 382/103 |
| 2003/0160757 A1* | 8/2003 | Shirai | G01C 1/04 |
| | | | 345/156 |
| 2009/0082991 A1* | 3/2009 | Prentice | G01C 15/00 |
| | | | 702/150 |
| 2010/0329653 A1* | 12/2010 | Kurosawa | G03B 17/00 |
| | | | 396/49 |

* cited by examiner

VIRTUAL PERSPECTIVE CENTER ALIGNED WITH MEASUREMENT CENTER

CROSS-REFERENCES TO RELATED APPLICATIONS

This application claims priority to U.S. Provisional Application No. 61/290,818, filed Dec. 29, 2009, the disclosure of which is incorporated herein by reference in its entirety for all purposes.

FIELD OF THE INVENTION

The present invention relates generally to cameras and position measurement systems. More particularly, the present invention relates to systems having a virtual perspective center of a camera aligned with a measurement center of a position measurement system.

BACKGROUND

A camera is often used with a position measurement system, such as a global navigation satellite system (GNSS) or an inertial navigation system (INS), to associate position and image information. Position and image information can be used, for example, with known photogrammetry techniques to determine the three-dimensional coordinates of points on objects. Such techniques may include measurements made in two or more overlapping photographic images taken from different positions. The photogrammetric measurements are made with respect to a perspective center of the camera, and the position measurements are made with respect to a center of the position measurement system (e.g., a phase center of an antenna or an axis of rotation of an INS unit). The photogrammetric measurements are typically defined relative to a camera coordinate frame, while the position measurements are typically defined relative to a real world or local coordinate frame.

The center of the position measurement system can be defined in the camera coordinate frame by fixing the camera to the position measurement system and calibrating the integrated device. This fixes the offset between the center of the position measurement system and the perspective center of the camera. Even with the camera fixed to the position measurement system, however, it is difficult to define the perspective center of the camera in the real world coordinate frame. The translation in x, y, and z directions must be accounted for, as well as the rotation about the x, y, and z axes. The computations require at least a knowledge of the rotation of the system about the x, y, and z axes, an over-constrained system of photogrammetric and position measurements, and/or points in the images with known coordinates in the real world coordinate frame. Obtaining this data generally requires additional hardware, increases computational complexity, and/or increases noise leading to inaccurate and unreliable results.

Thus, there is a general need in the art for improved systems for associating position and image information.

SUMMARY

Embodiments of the present invention overcome the deficiencies described above by providing improved systems for the integration of photogrammetric and position measurements. Embodiments of the present invention utilize a virtual perspective center than can be coincident with a measurement center. As explained more fully below, this is in contrast to conventional systems where a perspective center cannot be coincident with a measurement center because the physical components of the devices interfere with each other. Merely by way of example, some embodiments of the present invention provide an apparatus for acquiring image and location information where a virtual perspective center of a camera is coincident with a measurement center of a position measurement system. Such embodiments greatly reduce the computational complexity of defining the perspective center of the camera in the real world coordinate frame. This can improve measurement accuracy and reliability.

In accordance with an embodiment of the invention, an apparatus for acquiring image and location information includes an antenna comprising an element configured to receive signals for determining the location information. The apparatus also includes an imaging device coupled to the antenna and configured to acquire the image information. A virtual perspective center of the imaging device may be made to be effectively coincident with the element of the antenna.

In accordance with another embodiment of the invention, an imaging apparatus includes a position measurement device, an imaging device coupled to the position measurement device, and an optical element coupled to the imaging device. The optical element may be configured to receive light rays propagating along an optical path and direct the light rays towards a perspective center of the imaging device. The optical element may be arranged such that a virtual perspective center of the imaging device is coincident with the position measurement device.

In accordance with another embodiment of the invention, an apparatus for acquiring image and location information includes an antenna configured to receive signals for determining the location information, an imaging device coupled to the antenna, and an optical element coupled to the imaging device. The optical element may be configured to receive light rays propagating along an optical path and direct the light rays towards a perspective center of the imaging device. The perspective center of the imaging device may be located within the imaging device, and a virtual perspective center of the imaging device may located at a fixed position with respect to a phase center of the antenna.

In accordance with yet another embodiment of the invention, an imaging apparatus includes a position measurement device and an imaging device coupled to the position measurement device. A perspective center of the imaging device may be located within the imaging device, and a virtual perspective center of the imaging device may be located at a fixed position with respect to the position measurement device.

Numerous benefits are achieved using the present invention over conventional systems. For example, an embodiment according to the present invention provides an apparatus having a virtual perspective center of a camera that is coincident with a center of a position measurement system. The center of the position measurement system may be, for example, an antenna phase center of a GNSS antenna or an axis of rotation of an INS unit. This makes it easier to define the perspective center of the camera in the real world coordinate frame. Computational complexity can be reduced and measurement accuracy and reliability can be improved.

Depending upon the embodiment, one or more of these benefits may exist. These and other benefits are described throughout the specification and more particularly below.

DETAILED DESCRIPTION

Embodiments of the present invention include a camera, or imaging device, having a perspective center and a virtual perspective center. The perspective center and the virtual perspective center are created using an optical element to modify the path of the light rays entering the camera. The perspective center may also be referred to as the entrance pupil or "no-parallax point" of the camera. The virtual perspective center may be the point at which the light rays would intersect if their paths were not altered by the optical element. The optical element may be arranged such that the virtual perspective center of the camera is coincident with, or located at a fixed position with respect to, a center of a position measurement system. This simplifies the computations required to define the perspective center of the camera in the real world coordinate frame.

Figure 1A:
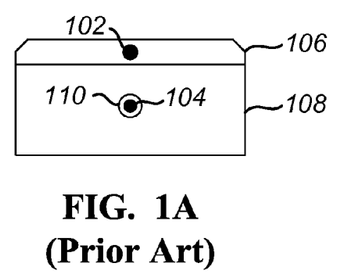
FIGS. 1A-1C are simplified diagrams showing a measurement center of a position measurement system and a perspective center of a camera according to a conventional system configured to provide image and position information.
Figure 1B:
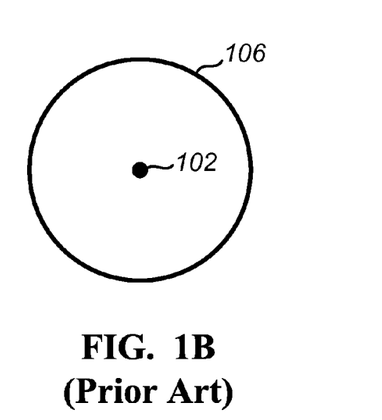
Figure 1C:
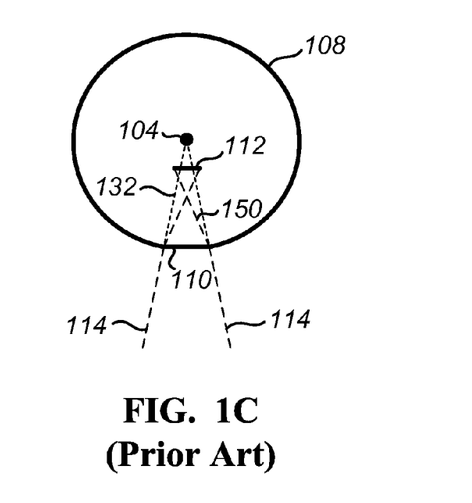

FIGS. 1A-1C are simplified diagrams showing a measurement center of a position measurement system and a perspective center of a camera according to a conventional system configured to provide image and position information. FIG. 1A is a simplified diagram illustrating a position measurement system 106 coupled to an camera 108. The position measurement system 106 includes a measurement center 102. The camera 108 includes a lens 110 and a perspective center 104.

FIG. 1B is a simplified plan view of the position measurement system 106 showing the measurement center 102. FIG. 1C is a simplified plan view of the camera 108 showing the perspective center 104 formed at an intersection of an apparent path 132 of light rays 114. An actual path 150 of the light rays 114 is different from the apparent path 132 due to refraction by the lens 110. The light rays 114 follow the actual path 150 towards an image sensor 112.

As can be seen in FIGS. 1A-1C, the perspective center 104 of the camera 108 cannot be coincident with the measurement center 102 of the position measurement system 106. For example, assuming the position measurement system 106 includes a GNSS antenna, the perspective center 104 of the camera 108 cannot be coincident with the measurement center 102 because the components of the camera 108 would interfere with the signal reception of the GNSS antenna. As another example, assuming the position measurement system 106 includes an INS unit, the perspective center 104 of the camera 108 cannot be coincident with the measurement center 102 because the components of the camera 108 would interfere with the motion and/or rotation sensors of the INS unit.

Figure 2:
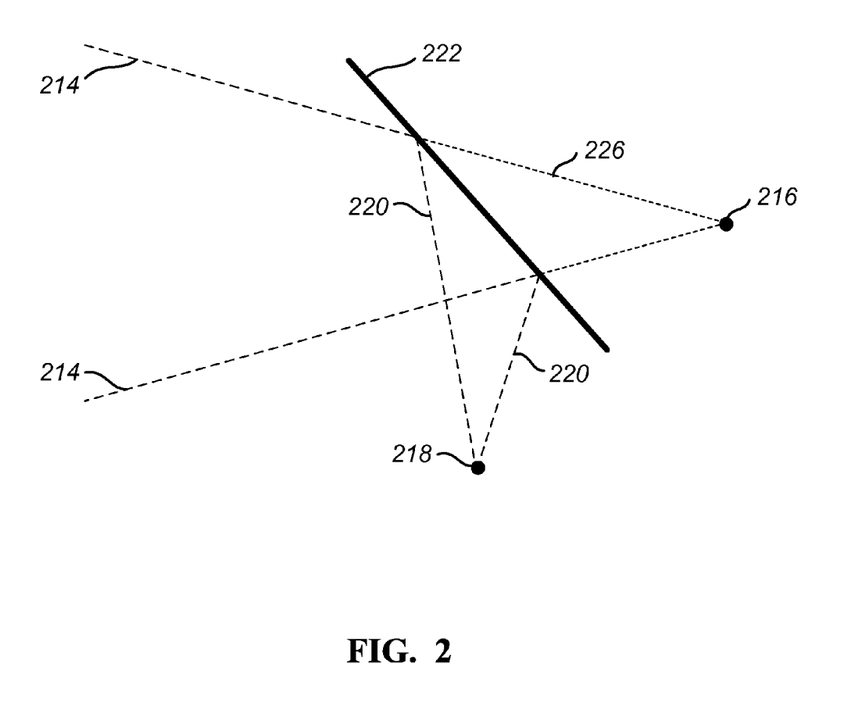
FIG. 2 is a simplified diagram of a perspective center and a virtual perspective center in accordance with an embodiment of the present invention.

In contrast to conventional systems, a virtual perspective center provided by embodiments of the present invention may be coincident with the measurement center of a position measurement system without interfering with signal reception or motion and/or rotation sensors. FIG. 2 is a simplified diagram of a perspective center and a virtual perspective center according to an embodiment of the present invention. FIG. 2 shows light rays 214 that are reflected by an optical element 222. The optical element 222 may be a mirror, prism, or any other reflective element suitable for modifying the path of the light rays in the manner described below. The reflected light rays 220 are directed towards a perspective center 218. In this example, a virtual perspective center 216 is located at a position where the perspective center would be located if the optical element 222 did not reflect the light rays 214. In this example, a dashed line 226 shows the approximate path that the light rays 214 would follow if not reflected by the optical element 222. Given the location and orientation of the optical element 222, the location of the perspective center 218 and the location of the virtual perspective center 216 can be determined in accordance with known techniques that may include, for example, ray-tracing and geometric calculations. Although in this example there are no further modifications to the path of the reflected light rays 220 between the optical element 222 and the perspective center 218, other optical elements such as lenses may alter the actual path of the light rays in some embodiments.

The camera, or imaging device, is not shown in this example for simplicity. The perspective center 218 may be, however, located within the imaging device. Similarly, the optical element 222 can be arranged such that the virtual perspective center 216 is coincident with a measurement center of a position measurement system. Alternatively, the optical element 222 can be arranged such that the virtual perspective center 216 is located at a fixed position with respect to a center of measurement of a position measurement system. For example, the virtual perspective center 216 may be aligned with an axis of the measurement center. As explained more fully below, the fixed position may be located within the imaging device, within the position measurement system, or it may be located outside both the imaging device and the position measurement system.

Figure 3A:
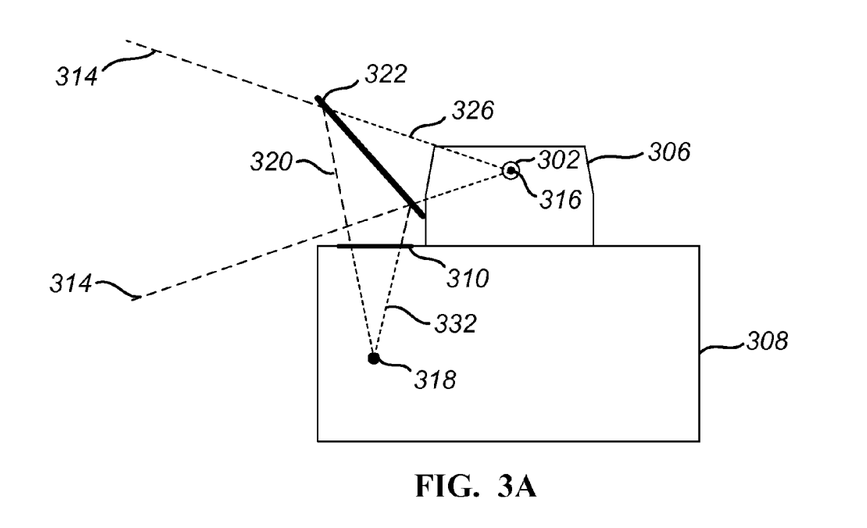
FIGS. 3A-3B are simplified diagrams of exemplary apparatus for acquiring image and location information in accordance with embodiments of the present invention.
Figure 3B:
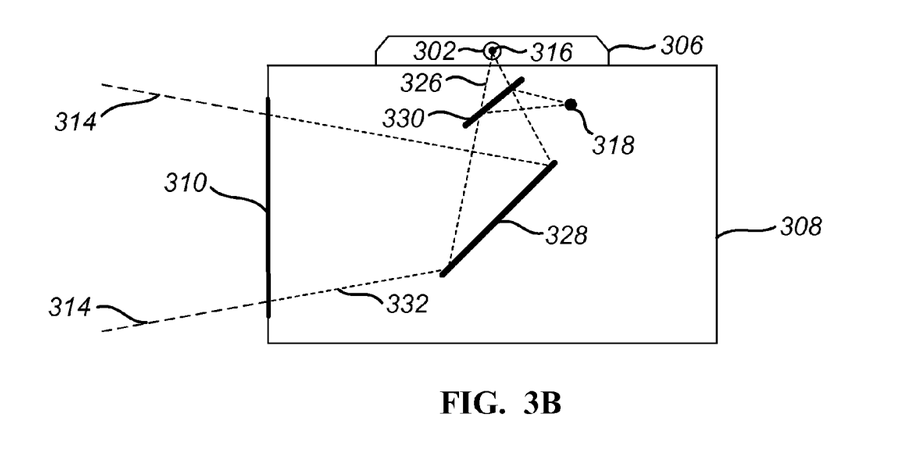

The virtual perspective center illustrated in FIG. 2 may be used in a number of systems configured to provide position and image information. As examples, FIGS. 3A-3B are simplified diagrams of exemplary apparatus for acquiring image and location information in accordance with embodiments of the present invention. FIG. 3A shows an apparatus that includes a position measurement device 306 and a imaging device 308.

The imaging device 308 may be may be a digital camera, a video camera, or any other device that is capable of acquiring image data using an image sensor. The image sensor and the actual path of the light rays as refracted by the lens 310 are not shown in FIG. 3A for simplicity. The image sensor, however, typically includes a predetermined number of photosensitive elements arranged in an array. For example, the image sensor may be a two-dimensional array of elements capable of generating image data from optical signals, such as light rays, impinging on the elements. The image sensor may be a charge-coupled device (CCD) or a complimentary metal-oxide-semiconductor (CMOS) image sensor. Other suitable image sensors containing photosensitive elements are to be included within the scope of the present invention.

As shown in FIG. 3A, the apparatus also includes an optical element 322 arranged to direct light rays 314 through the lens 310. The optical element may be coupled to the position measurement device 306 and/or the imaging device 308. The light rays 314 are reflected by the optical element 322 towards the perspective center 318. FIG. 3A shows the apparent path 332 of the light rays passing through the lens 310 rather than the actual path of the light rays. The actual path of the light rays refracted by the lens 310 is not shown for simplicity. The apparent path 332 may be the path that the light rays 314 would follow if not refracted by the lens 310. The perspective center 318 in this example is approximately at the point of intersection of the apparent path 332 of the light rays.

The apparatus also includes a virtual perspective center 316 located at a position where the light rays 314 would intersect if not reflected by the optical element 322. FIG. 3A includes a dashed line 326 indicating the approximate path the light rays 314 would follow if not reflected by the optical element 322.

The position measurement system 306 may be coupled to the imaging device 308 and may include a GNSS antenna, an integrated GNSS antenna and receiver, a wireless telemetry antenna, an INS unit, a reflective target for use with a total station, or any other device that is suitable for use in making position measurements. Position measurements are typically made with reference to a real world coordinate frame or a particular object or location in a local coordinate frame. The position measurement system 308 includes a measurement center 302. The measurement center 302 may be, for example, a phase center of a GNSS antenna, an axis of rotation of an INS unit, or a measurement center of a reflective target. Typically the measurement center 302 is designed by the manufacturer to be in a particular location. The location of the measurement center 302 with respect to the position measurement system 306 may be specified by the manufacturer or it may be determined in accordance with known techniques.

Although the measurement center 302 is illustrated as being located near a physical center of the position measurement system 306, such an orientation is not required with embodiments of the present invention. The present invention is not limited to any particular positional relationship between the measurement center 302 and the position measurement system 306. For example, an antenna may include an element that is not centered within a housing, or the antenna may have a phase center that is not centered with the element. Some patch antennas, for example, have phase centers that are located in positions other than the physical surface of the patch antenna. The phase center may be, for example, located above the surface of the patch antenna. Exemplary patch antennas that may be used with embodiments of the present invention are described in commonly owned U.S. Pat. No. 5,515,057, filed Sep. 6, 1994, and N0. 5,165,109, filed Aug. 22, 1991, the contents of which are hereby incorporated by reference in their entirety for all purposes. The location of the phase center in relation to the antenna surface or another reference point can be determined in accordance with known techniques. Thus, measurement center 302 may be located anywhere within or even remote to the position measurement system 306.

As shown in FIG. 3A, the virtual perspective center 316 may be coincident with the measurement center 302 of the position measuring device 306. In this example the virtual perspective center 316 and the measurement center 302 exist in substantially the same location. In this configuration, the origin of the camera coordinate frame, or the imaging device coordinate frame, is located at a known position in the real world or local coordinate frame. Alternatively, the virtual perspective center 316 may be located in a fixed position with respect to the measurement center 302 of the position measuring system 306. In accordance with embodiments of the present invention, the virtual perspective center 316 may be located in any position relative to the measurement center 302 depending on the orientation of the optical element 322. For example, the virtual perspective center 316 may be located either above or below the measurement center 302 along an axis aligned with the local gravity vector. The virtual perspective center 316 may also be located on a plane that passes through the measurement center 302 and is perpendicular to the local gravity vector. In these configurations, constraints can be applied, such as leveling the apparatus with respect to the local gravity vector, that further simplify transformations between the camera coordinate frame and the real world or a local coordinate frame. One of ordinary skill in the art would recognize many variations, modifications, and alternatives.

FIG. 3B shows an apparatus that includes a position measurement device 306 and an imaging device 308 according to another embodiment of the invention. This embodiment includes a first optical element 328 and a second optical element 330 that are both disposed within a housing of the imaging device 308. The first and second optical elements 328, 330 are positioned to direct the actual path of the light rays refracted by lens 310 towards an image sensor. Similar to FIG. 3A, the image sensor and the actual path of the light rays are not shown for simplicity. Instead, FIG. 3B shows an apparent path 332 of the light rays. The apparent path 332 may be the path that the light rays 314 would follow if not refracted by the lens 310. The optical elements 328, 330 are arranged to direct the apparent path 332 of the light rays towards the perspective center 318.

In this example, the first and second optical elements 328, 330 are arranged such that a virtual perspective center 316 of the imaging device 308 is coincident with a measurement center 302 of the position measurement system 306. The virtual perspective center 316 is located approximately at the position where the perspective center 318 would be located if the apparent path 332 of the light rays was not altered by the optical element 330. As explained above, the measurement center 302 may be an antenna phase center or a center or rotation of the position measurement device 306. As also explained above, the virtual perspective center 316 of the imaging device 308 may be located in any position with respect to the measurement center 302 of the position measurement system 306.

It is to be understood that the embodiments illustrated in FIGS. 3A-3B are provided merely as examples to illustrate various functions and features of the present invention. Embodiments of the present invention, however, are not to be limited to these particular configurations. For example, embodiments of the present invention may include any number of optical elements disposed within and/or outside the imaging device. The embodiment illustrated in FIG. 3A may include more than one optical element with one or more of the optical elements disposed within the imaging device. The embodiment illustrated in FIG. 3B may include a single optical element or any number of optical elements. Further, in some embodiments one or more optical elements may be disposed within the position measurement system. Also, the imaging device may include any number or configuration of lenses or other members that reflect or refract the light rays. Similarly, embodiments of the present invention may be used with an imaging device that does not include a lens, or the optical element may function as the lens. Thus, the functions and features of the present invention are not limited to a particular configuration.

Figure 4A:
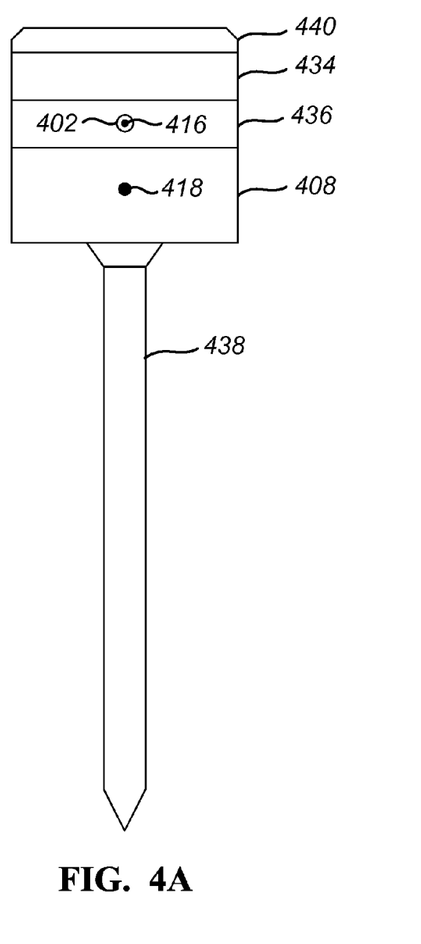
FIGS. 4A-4B are simplified diagrams of exemplary apparatus for acquiring image and location information in accordance with other embodiments of the present invention.
Figure 4B:
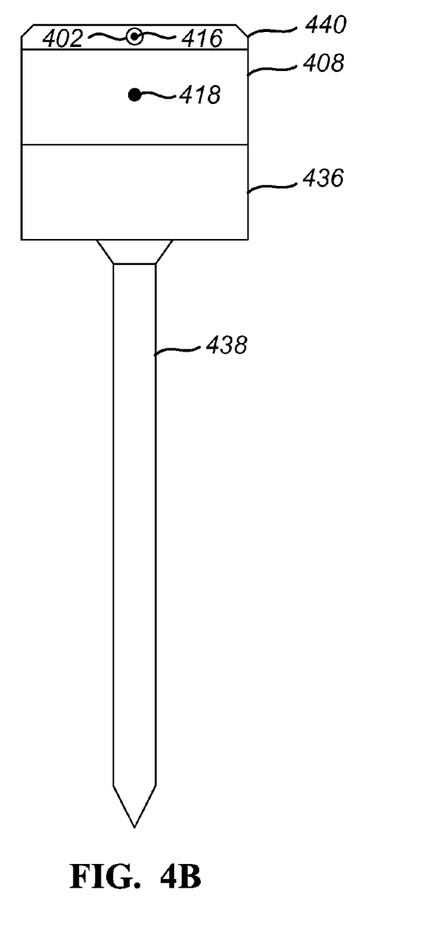

As examples of other configurations, FIGS. 4A-4B are simplified diagrams of exemplary apparatus for acquiring image and location information according to other embodiments of the present invention. FIG. 4A shows an apparatus having an antenna 440, for example a GNSS antenna, that may be coupled to a GNSS receiver 434. The GNSS receiver may be coupled to an INS unit 436 having a measurement center 402. The measurement center 402 may be a center of rotation of the INS unit. The INS unit 436 may be coupled to an imaging device 408 having perspective center 418. The above components may be coupled to, or mounted on, a pole 438. The pole 438 may be, for example, a surveyors pole that may also have other surveying devices coupled to it.

Although not shown in FIG. 4A, the apparatus also includes at least one optical element. The optical element(s) may be, for example, coupled to the apparatus or disposed within the imaging device 408. In this example, the optical element(s) may be arranged such that a virtual perspective center 416 of the imaging device 408 is coincident with the measurement center 402 of the INS unit. In other embodiments, the virtual perspective center 416 may be located in any position with respect to the measurement center 402 as explained previously.

FIG. 4B shows an apparatus having an antenna 440 such as a GNSS antenna. The antenna 440 has a measurement center 402. The measurement center may be the phase center of the antenna 440. The antenna 440 may be coupled to an imaging device 408. As illustrated in FIG. 4B, the imaging device 408 includes a perspective center 418. The imaging device 408 may be coupled to an INS unit 436, which may be coupled to a pole 438. In this example, the antenna 440 may be integrated with a receiver, for example a GNSS receiver, or the receiver may be coupled to a different part of the apparatus or located remotely.

Although not shown in FIG. 4B, the apparatus also includes at least one optical element. In this example, the optical element(s) may be arranged such that a virtual perspective center 416 of the imaging device 408 is coincident with the measurement center 402 of the antenna 440. In other embodiments, the virtual perspective center 416 may be located in any position with respect to the measurement center 402. One of ordinary skill in the art would recognize many variations, modifications, and alternatives.

It is to be understood that the features of one or more embodiments of this invention may be combined with one or more features of other embodiments of the invention without departing from the scope of the invention. Also, the examples and embodiments described herein are for illustrative purposes only, and various modifications or changes in light thereof will be evident to persons skilled in the art and are to be included within the spirit and purview of this application and scope of the appended claims.

What is claimed is:

1. An apparatus for acquiring image and location information comprising:
    a global navigation satellite system (GNSS) device configured to measure a position of the apparatus in a real world coordinate frame, the GNSS device including an antenna comprising an element configured to receive signals for determining the position of the apparatus, the element forming a measurement center of the GNSS device;
    an imaging device coupled to the GNSS device and configured to acquire the image information from light rays entering the imaging device, the imaging device having a perspective center located at a no-parallax point of the imaging device;
    a lens coupled to the imaging device and configured to receive the light rays; and
    an optical element coupled to the imaging device in a fixed position and arranged to alter a path of the light rays by reflecting the light rays so that the perspective center of the imaging device is located separate from a virtual perspective center of the imaging device, the virtual perspective center being a single point located where the no-parallax point of the imaging device would be located if the light rays were not reflected by the optical element, the perspective center and the virtual perspective center being real points, a location of the perspective center being based on an arrangement of the optical element, and a location of the virtual perspective center being fixed relative to the imaging device, wherein the optical element is arranged so that the perspective center is spaced from the virtual perspective center, and the GNSS device is arranged so that a location of the virtual perspective center of the imaging device is coincident with and overlaps the element of the antenna so that an origin of a coordinate frame of the imaging device overlies the measurement center of the GNSS device.

2. The apparatus of claim 1 wherein the imaging device comprises a housing, and wherein the perspective center of the imaging device is located within the housing.

3. An apparatus for acquiring image and location information comprising:
    a global navigation satellite system (GNSS) device configured to measure a position of the apparatus in a real world coordinate frame, the GNSS device including an antenna comprising an element configured to receive signals for determining the position of the apparatus, the element forming a measurement center of the GNSS device;
    an imaging device coupled to the GNSS device and configured to acquire the image information from light rays entering the imaging device, the imaging device having a perspective center located at a no-parallax point of the imaging device;
    a lens coupled to the imaging device and configured to receive the light rays; and
    an optical element coupled to the imaging device in a fixed position and arranged to alter a path of the light rays by reflecting the light rays so that the perspective center of the imaging device is located separate from a virtual perspective center of the imaging device, the virtual perspective center being a single point where the no-parallax point of the imaging device would be located if the light rays were not reflected by the optical element, the perspective center and the virtual perspective center being real points, and a location of the perspective center being based on an arrangement of the optical element, wherein the optical element is arranged so that the perspective center is spaced from the virtual perspective center, and the GNSS device is arranged so that a location of the virtual perspective center of the imaging device is coincident with and overlaps the element of the antenna so that an origin of a coordinate frame of the imaging device overlies the measurement center of the GNSS device.

4. An apparatus for acquiring image and location information, comprising:
    a position measurement device configured to acquire the location information, the position measurement device including either a global navigation satellite system (GNSS) device or an inertial measurement unit, the position measurement device having a measurement center;

an imaging device coupled to the position measurement device and configured to acquire the image information from light rays entering the imaging device, the imaging device including a perspective center located at a no-parallax point of the imaging device; and an optical element coupled to the imaging device in a fixed position and arranged to alter a path of the light rays by reflecting the light rays so that the perspective center of the imaging device is located separate from a virtual perspective center of the imaging device, the virtual perspective center being a point where the no-parallax point of the imaging device would be located if the light rays were not reflected by the optical element, wherein a location of the perspective center is based on an arrangement of the optical element, and a location of the virtual perspective center is fixed relative to the imaging device, the GNSS device being arranged relative to the optical element so that a location of the virtual perspective center is coincident with and overlaps the measurement center so that an origin of a coordinate frame of the imaging device overlies the measurement center of the position measurement device.

5. The apparatus of claim 4 wherein the measurement center is a phase center of an antenna of the GNSS device or a center of rotation of the inertial measurement unit.

6. The apparatus of claim 4 wherein the position measurement device is the GNSS device and the measurement center is a phase center of the GNSS device.

7. The apparatus of claim 4 wherein the position measurement device is the inertial measurement unit and the measurement center is a center of rotation of the inertial measurement unit.

8. The apparatus of claim 4 wherein the optical element includes a mirror.

9. The apparatus of claim 4 wherein the optical element includes a prism.

10. The apparatus of claim 4 wherein the optical element includes a plurality of optical elements.

11. The apparatus of claim 4 wherein the imaging device includes one or more lenses.

12. The apparatus of claim 4 wherein the imaging device is a digital camera.

* * * * *